US012781816B2

(12) United States Patent
Shahin

(10) Patent No.: US 12,781,816 B2
(45) Date of Patent: Nov. 3, 2026

(54) BRAKE PAD CARRIER COMPRISING HOLLOW PART AND/OR PART MADE FROM A SHEET MATERIAL

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 315 days.

(21) Appl. No.: 18/518,487

(22) Filed: Nov. 23, 2023

(65) Prior Publication Data

US 2024/0280149 A1 Aug. 22, 2024

(30) Foreign Application Priority Data

Feb. 21, 2023 (DE) ......................... 102023104224.6

(51) Int. Cl.
*F16D 65/00* (2006.01)
*F16D 55/00* (2006.01)

(52) U.S. Cl.
CPC ..... *F16D 65/0006* (2013.01); *F16D 65/0056* (2013.01); *F16D 2055/0008* (2013.01); *F16D 2250/0023* (2013.01)

(58) Field of Classification Search
CPC ............. F16D 65/0006; F16D 65/0056; F16D 2055/0008; F16D 2250/0023
USPC ................................ 188/73.31, 73.37, 73.39
See application file for complete search history.

(56) References Cited

U.S. PATENT DOCUMENTS

| | | | | |
|---|---|---|---|---|
| 6,345,701 B1 * | 2/2002 | Di Ponio | .............. | F16D 55/227 188/73.31 |
| 10,247,266 B2 * | 4/2019 | Kincaid | ................ | F16D 55/226 |
| 2007/0023240 A1 * | 2/2007 | Dessouki | ............ | F16D 65/0018 188/73.39 |
| 2010/0207341 A1 * | 8/2010 | Murata | ................ | B60G 13/005 280/93.512 |
| 2020/0080605 A1 * | 3/2020 | Hourihan | ................ | F16D 55/22 |

FOREIGN PATENT DOCUMENTS

| | | | | |
|---|---|---|---|---|
| DE | 1802765 B1 | 11/1971 | | |
| DE | 1750907 C3 | 6/1975 | | |
| DE | 3036985 A1 | 5/1982 | | |
| DE | 19626297 A1 * | 1/1998 | ........... | F16D 55/224 |
| DE | 102012006110 A1 | 9/2013 | | |
| DE | 102013111258 A1 | 4/2015 | | |
| EP | 3659900 A1 | 6/2020 | | |
| WO | 1997-005400 A1 | 2/1997 | | |
| WO | 2015052304 A1 | 4/2015 | | |

OTHER PUBLICATIONS

DE OA dated Sep. 6, 2023.

* cited by examiner

*Primary Examiner* — Christopher P Schwartz
(74) *Attorney, Agent, or Firm* — Harvest IP Law, LLP

(57) ABSTRACT

The invention relates to a brake pad carrier (14) for a vehicle disc brake (11),
the vehicle disc brake (11) comprises a brake disc (16) that is configured to rotate about a rotation axis (R) and a pair of brake pads (26) to be carried by the brake pad carrier (14), a first brake bad pad (26) being configured to contact a first side face of the brake disc (16) and a second brake pad (26) being configured to contact an opposite second side face of the brake disc (16).

9 Claims, 6 Drawing Sheets

BRAKE PAD CARRIER COMPRISING HOLLOW PART AND/OR PART MADE FROM A SHEET MATERIAL

CROSS-REFERENCE TO RELATED APPLICATION

This application claims the benefit of Deutches Patent Application No. 102023104224.6, filed on Feb. 21, 2023 in the Deutches Intellectual Property Office, the disclosure of which is incorporated herein by reference.

BACKGROUND

1. Field

Embodiments of the present disclosure relate to a brake pad carrier for a vehicle disc brake and to a method for manufacturing this brake pad carrier.

2. Description of the Related Art

Brake pad carriers are known in the context of vehicle disc brakes, e.g. from EP 3 498 395 A1. In the prior art, these members are produced by metal casting. While this is proven and established, metal casting requires a lot of energy, thereby increasing manufacturing costs as well as a carbon dioxide footprint of the brake pad carrier. Also, manufacturing the brake pad carrier as a metal casted part usually results in a high weight.

In addition, it has been observed that a desired brake performance cannot not always be achieved, e.g. in connection with the so-called noise, vibration and harshness (NVH) characteristics of vehicle. These NVH characteristics are significantly affected by the brake pad carrier which represents a main component of a vehicle disc brake.

SUMMARY

Therefore, the present application is directed to the problem of how to improve a brake pad carrier so that at least some of these existing drawbacks can at least somewhat be limited.

This object is solved by the subject-matter according to the independent claims. Advantageous embodiments are set out in this description, in the figures and in the dependent claims.

Accordingly, a brake pad carrier for a vehicle disc brake is disclosed. The vehicle disc brake comprises a brake disc that is configured to rotate about a rotation axis and a pair of brake pads to be (or that are) carried by the brake pad carrier, a first brake bad pad being configured to contact a first side face of the brake disc and a second brake pad being configured to contact an opposite second side face of the brake disc.

The brake pad carrier comprises:

a first portion that is configured to be arranged on the first side face of the brake disc and configured to support the first brake pad (e.g. by comprising a guiding slot receiving said first brake pad);

a second portion that is configured to be arranged on the second side face of the brake disc and configured to support the second brake pad (e.g. by comprising a guiding slot receiving said second brake pad);

at least one connecting portion connecting the first portion and the second portion and configured to extend from the first side face to the second side face of the brake disc, wherein at least one of the first portion, the second portion and the connecting portion comprises a part that is at least one of:

a) a part having a hollow cross-sectional shape;

b) a part comprising sheet metal or sheet plastic.

The first portion and/or the second portion may extend along a rear face (i.e. a face facing away from the brake disc) of the respectively carried one of the first and second brake pad. This may correspond to an extension along (and/or opposite to) a respectively adjacent side face of the brake disc and/or may correspond to an extension along or in a circumferential direction.

Optionally, the first portion and/or the second portion may comprise at least one radially extending portion. This radially extending portion may e.g. extend radially further outward than an outer circumference of the brake disc. It may merge into or be connected to a connecting portion of the presently disclosed kind.

Terms such as axial, radial and circumferential used herein may relate to the rotation axis. An axial axis, extension or direction may extend along the rotation axis; a radial axis, extension or direction may extend at an angle and in particular orthogonally to the rotation axis and a circumferential extension or direction may extend about the rotation axis.

The at least one connecting portion may span across the brake disc, e.g. from one side face thereof to the other. It may thus connect the first and second portion which may remain at different sides of the brake disc. The at least one connecting portion may extend axially. It may be provided at a radial distance to a circumference of the brake disc.

There may be two connecting portions that connect (e.g. circumferentially) outer end portions of the first and second portion. These end portions may be axially opposite to one another.

The connecting portion (in particular two connecting portions) as well as the first and second portion may define a frame-like structure, e.g. having a closed footprint or outline, in particular a substantially rectangular footprint. Generally, the brake pad carrier may receive an outer circumferential segment of the brake disc and/or surround said outer circumferential segment on three sides (e.g. on both of the side faces as well as on an outer circumferential face of the brake disc).

The brake pads may be carried by the brake pad carrier so as to be permanently supported and/or contacted thereby. The guidance and/or support of the brake pads by the brake pad carrier may be configured according to known configurations. For example, the brake pad carrier may comprise axially extending guide slots for receiving guiding projections of the guide pads, e.g. so-called guiding ears. The brake pads may be axially displaceable along said guide slots towards and away of a respectively opposite side face of the brake disc.

The part that is configured according to option a) or b) above may generally be referred to as a part herein. This part may form one segment of the brake pad carrier. For example, it may form an entire segment or section of the brake pad carrier in which no other part is present. This segment or section may correspond to a section along a longitudinal axis of a portion of the brake pad carrier. The part may be joined to adjacent segments or sections which are optionally also formed by parts that are configured according to option a) and/or b) above.

In one example, the brake pad carrier comprises a plurality of respective parts, the parts being joined to one another, e.g. by welding, gluing, soldering or by rivets or by other mechanical fixing elements. The parts may form a succession of a sequence of parts, e.g. along at least one longitudinal axis of a portion of the brake pad carrier In one example, the brake pad carrier is entirely configured out of parts that are each configured according to options a) and/or b) above. As detailed below, the brake pad carrier may generally be free of any casted parts, in particular any metallic casted parts.

The part may generally comprise or be made of a metallic material, such as steel, iron or aluminium. Additionally or alternatively, it may comprise a plastic material.

The part may be elongated (but e.g. curved or angled) and/or it may be straight. The part may have a homogeneous structure and/or a homogeneous material composition. For example, it may be a one-piece part and/or an integral part that is e.g. manufactured by extrusion, casting or bending. Alternatively, the part may be a multi-piece assembly of separate sub-parts (in particular integral sub-parts and/or parts each having a homogeneous structure and/or a homogeneous material composition). Said sub-parts are e.g. joined according to any of the examples herein, in particular to form an entire segment or section of the brake caliper as discussed above. Additionally or alternatively, the sub-parts may be at least partially inserted into and/or overlap one another, so as to provide a double-walled structure.

For example, in case of option b) above, each sub-part may comprise a section of sheet material that is arranged and/or formed into a part that forms a complete segment of the brake pad carrier.

The hollow cross-sectional shape according to option a) may refer to a hollow state of the part when provided in the brake pad carrier, i.e. the part may be permanently hollow. Alternatively, the part may only be initially hollow (e.g. by being produced as a respective hollow part) and said hollow cross-section may be filled according to any of the examples discussed herein when the part is included in the brake pad carrier.

Providing the part with a hollow cross-section may help to reduce weight. Also, the hollow cross-section provides a volume in which a vibration dampening material according to any of the below examples can be received. This can help to limit vibrations and related noise emissions during braking.

A respective hollow cross-section is a difficult to provide when configuring the part and/or the entire brake pad carrier as a casted part. Therefore, it is preferred that especially in case of option a) above, the part is not produced by metal casting, but e.g. by extrusion or by bending a sheet material according to option b) so as to comprise a respective hollow section.

In case of option b) above, the sheet material (i.e. the sheet metal and/or the sheet plastic) may initially be planar. Yet, for manufacturing the part, this planar shape may be permanently changed, e.g. by bending or by different forming or reshaping measures. For example, multiple kinks and/or bents may be provided so as to form the sheet material into a part having a hollow cross-section. Opposite edges of the sheet material may be joined, e.g. by welding, so as to permanently close said hollow cross-section.

Manufacturing the part from sheet material according to option b) above enables a cheap and energy efficient production of the part. Also, it allows for producing double-walled and/or hollow configurations of the part by means of which any of the above advantages can be provided as well.

Generally, the disclosed brake pad carrier is marked by a reduced weight e.g. compared to a casted part. Nonetheless, it can be provided with a similar or even increased stiffness, due to a large moment of inertia of the hollow cross-section and/or of the part when formed from sheet material.

Still further, in particular when using a plurality of parts, sections of the brake pad carrier can be formed which have more equal mechanical characteristics than often the case in casted brake pad carriers. For example, the vibration characteristics (e.g. in form of Eigenfrequencies) can be more closely adjusted between such a plurality of parts than in between different segments of a casted part. One reason is that the parts disclosed herein can e.g. be produced with greater precision than metal casted part, in particular by avoiding casting errors, such as cavities.

In one embodiment that is based on the above option a), the hollow cross-section is at least partially filled with a vibration dampening material. In particular, the area of the cross-section may be fully filled. This may be provided along only a section of the part or alternatively along the complete length of the part and even further into an optional adjacent part.

In a further embodiment that is based on the above option b), the sheet metal or sheet plastic is arranged and/or formed to comprise at least one section into which a vibration dampening material is filled. For example, a respective sheet material may be bent to form two sub-parts with hollow cross-sections that are partially inserted into one another, so as to form a double-walled structure. A space between said double-walls may receive a vibration dampening material. Alternatively, indentations, notches or recesses may be formed from and/or into a sheet material, so as to receive and/or or at least partially surround a vibration dampening material.

The vibration dampening material may generally be a non-metallic material. It may be a loose material, such as a bulk material or a particulate material. It may comprise a foam material, a porous material and/or a material that is more elastic and/or softer than a material of the part (or than any other material of the brake pad carrier). Other examples of vibration dampening materials include materials comprising or consisting of an elastomer, a phenolic material, a fibre reinforced plastic (e.g. glass fibre, carbon fibre or aramid fibre), a polyurethane foam or a hard polyvinylchloride foam. The vibration dampening material may comprise any combination of any of the material examples disclosed herein.

In a further embodiment that is based on the above option b), the sheet metal or sheet plastic is arranged and/or formed to define at least one double-walled section of the part. This may provide a recess for receiving a vibration dampening material.

Generally, it is to be noted that even when no vibration dampening material is received in any of the hollow portions or recesses discussed herein, this may still result in an improved vibration characteristics. For example, air enclosed by and/or received in the part may still contribute to dampening vibrations.

In a further example that is based on the above option a), the part is an extruded profile. This represents a cheap, yet precise manufacturing method for producing the part. The part may generally be and elongated member or elongated profile (that is not necessarily produced by extrusion, but alternatively e.g. by folding a sheet material).

In one aspect, the second portion comprises a bridge portion extending along a rear face of the second brake pad, and part being comprised by said bridge portion. For example, the part may form the entire or at least a section of said bridge portion, e.g. at least one third thereof. It has been found that arranging the part in (or, put differently, so as to form) at least part of said bridge portion provides a particularly large potential for weight saving and vibration reduction compared to known casted designs.

According to one example, there are two connecting portions that are spaced apart along a circumference of the brake disc, wherein both connecting portions comprise a respective part. These parts are e.g. configured identically to one another. The two connecting portions may connect outer edge portions of the first and second part to one another. For example, they may each connect a pair of outer end portions of the first and second part, said outer end portions being arranged axially opposite to one another. The connecting portions may form and/or be comprised by circumferentially outermost portions of the brake pad carrier.

By providing identical parts in said connecting portions (e.g. in terms of shape and dimension), the brake pad carrier can be provided with an increased structural symmetry. This can e.g. be beneficial in terms of the number and extent of Eigenfrequencies.

A further example includes that a respective part is provided in each of at least two of the first portion, the second portion and the connecting portion, these parts being shaped and/or dimensioned identically to one another. Again, this renders the structure of the brake pad carrier more symmetric and/or homogeneous, thereby improving its vibration characteristics. Also, this may reduce complexity of the brake pad carrier, thereby reducing production costs.

In one example, the entire brake pad carrier as composed of a plurality of parts that are each configured according to any of the examples disclosed herein. The parts are joined to one another to form the brake pad carrier. In one example, each part is elongated and/or forms an entire section of a segment of the brake pad carrier (e.g. of its respective first, second and/or connection portion). Again, this section or segment may be comprised by or correspond to a section or segment of a longitudinal axis of the brake pad carrier. Each part may have two opposite end portions that e.g. face away from one another. At each end portion, a part may be connected to a respectively adjacent part. Put differently, the brake pad carrier may be configured as a succession, sequence or chain of parts that are joined to one another, with each part being configured according to one of the examples disclosed herein.

Accordingly, in one embodiment a plurality of respective parts is provided, wherein at least two adjacent parts are joined to one another. As noted above, at least some parts and preferably every part may have (e.g. at each of its opposite end portions) two adjacent parts to each of which it may be joined. Any joining technology as disclosed herein may be used for this purpose, e.g. welding, gluing, soldering or mechanical joining, e.g. by means of rivets.

According to a general, yet optional aspect, the part is produced by other methods than metal casting, in particular wherein brake pad carrier is free of any metal casted parts (or segments), i.e. does not include any metal casted parts (or segments). In other words, the brake pad may be produced entirely independently of metal casting.

The invention also concerns a method for manufacturing a brake pad carrier for a vehicle disc brake. The vehicle disc brake comprises a brake disc that is configured to rotate about a rotation axis and a pair of brake pads that are carried by the brake pad carrier, a first brake pad being configured to contact a first side face of the brake disc and a second brake pad being configured to contact an opposite second side face of the brake disc;

wherein the brake pad carrier comprises:

a first portion that is configured to be arranged on the first side face of the brake disc and configured to support the first brake pad;

a second portion that is configured to be arranged on the second side face of the brake disc and configured to support the second brake pad;

at least one connecting portion connecting the first portion and the second portion and configured to extend from the first side face to the second side face of the brake disc, the method comprising: manufacturing at least one of the first portion, the second portion and the connecting portion from a part (e.g. by including, providing or inserting said part) that is at least one of:

a) a part having a hollow cross-sectional shape;

b) a part comprising sheet metal or sheet plastic.

The method may further comprise: manufacturing the part according to option a) by extrusion; and/or manufacturing the part according to option b) by bending.

The method may generally be configured to manufacture a brake pad carrier according to any of the examples disclosed herein. In particular, the method may include any further measures or features to provide a brake pad carrier according to any of the embodiments disclosed herein. Any of the developments and variants discussed in connection with the brake pad carrier may also apply to corresponding features of the method.

Embodiments of the invention are discussed in the following with respect to the attached schematic figures. Throughout the figures, same or similar features may be marked with same reference signs.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are presented in order to sufficiently convey the ideas of the present disclosure to a person skilled in the art to which the present disclosure belongs. The present disclosure is not limited to the embodiments shown herein and may be embodied in other forms. To clarify the present disclosure, the drawings may omit portions that are not relevant to the description, and the sizes of components may be somewhat exaggerated for easy understanding.

Figure 1:
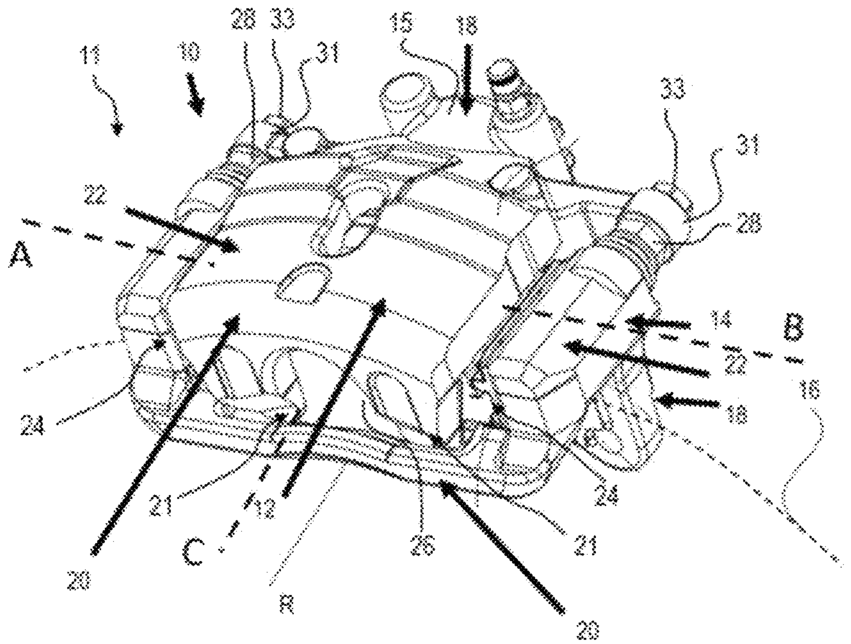
FIG. 1 is a perspective view of a vehicle disk brake comprising a brake pad carrier that is configured according to a prior art example.

FIG. 1 shows a prior art brake caliper assembly 10 of a vehicle disc brake 11, the brake caliper assembly 10 being configured according to generally known floating caliper principles. It is noted that the present invention is not limited to floating calipers, but can also be used in fixed calipers. The brake caliper assembly 10 comprises a brake caliper housing 12 that is slidingly supported by a stationary brake pad carrier 14.

The brake caliper assembly 10 is generally configured to press brake pads 26 (one of which is partially visible in FIG. 1) against a brake disc 16. The brake pads 26 are received in and guided by the brake pad carrier 14. Only part of an outer circumferential edge of the brake disc 16 is indicated by a dashed line in FIG. 1, the brake disc 16 generally being configured according to known examples. Further, a rotation axis R about which the brake disc 16 rotates is schematically indicated by a dotted line in FIG. 1.

The brake caliper housing 12 comprises a receiving section 15. Only an outer wall of said receiving section 15 is visible in FIG. 1 and the receiving section 15 is formed as an (non-visible) open cylindrical cavity. In said receiving section 15, a non-illustrated brake piston is received.

The brake caliper housing 12 comprises a piston side 18 located at a first side face of the brake disc 16 and specifically at the same side face as the receiving section 15. Further, the brake caliper housing 12 comprises a finger side 20 located at the respective opposite side face of the brake disc 16 compared to the piston side 18. The finger side 20 comprises (merely as an example) two finger portions 21 according to known configurations.

The finger side 20 and the piston side 18 are connected to one another by an axial section 22. The axial section 22 overlaps with the outer circumferential surface of brake disc 16 or, put differently, axially spans across the brake disc 16 and/or extends from one of the side faces of said brake disc 16 to the other.

Figure 2:
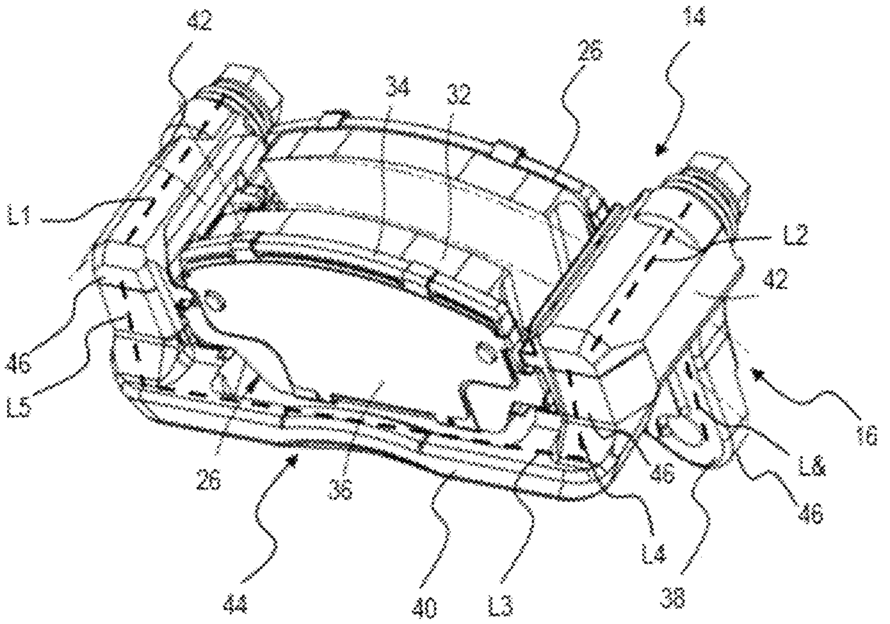
FIG. 2 is a perspective view of the brake pad carrier of the vehicle disc brake of FIG. 1.

In a generally known manner, the brake piston received in the receiving section 15 and the inside of the finger portions 21 that face away from the viewer in FIG. 2 are configured to rest against the brake pads 26 and to press them against the brake disc 16.

The brake pad carrier 14 is also discussed with reference to FIG. 2 in the following. The brake pad carrier 14 comprises a first portion 38 (at a piston side of the brake caliper housing 12), a second portion 40 (at a finger side of the brake caliper housing 12) and two connecting portions 42. Much like the axial sections 22 of the brake caliper housing 12, each connecting portion 42 overlaps with the outer circumferential surface of brake disc 16 or, put differently, axially spans across the brake disc 16 and/or extends from one of the side faces of said brake disc 16 to the other.

Each connecting portion 42 connects two circumferential end portions of the first and second portion 38, 40. These end portions are axially opposite to one another.

The first portion 38 is only partially visible in FIG. 2. Yet, is has a similar configuration as the second portion 40 and its below discussed longitudinal axes L2-L4.

Guiding grooves (or slots) 24 are provided in the brake pad carrier 14 for slidingly receiving the two brake pads 26, one of said guiding grooves 24 being partially visible in FIG. 1. The brake pads 26 are located on opposite side faces of the brake disc 16. The brake pads 26 are generally identical to one another, but are oriented differently to face the different side faces of the brake disc 16.

FIG. 1 also illustrates that the movable brake caliper housing 12 is slidingly supported by and guided relative to the brake pad carrier 14 by means of guide pins 28 at both of a trailing side and leading side of the brake caliper assembly 10.

In FIG. 2, it can be seen that each brake pad 26 is configured according to known examples by comprising a friction lining 32, a backplate 34 and a shim 36. The brake disc 16 is indicated by two parallel curved lines in FIG. 2 (see dash-dotted lines in between brake pads 26).

In FIG. 2, longitudinal axes L1-L6 of elongated sections comprised by the first portion 38, second portion 40 and the two connection portions 42 are shown. The connection portions 42 each comprise one elongated section and thus one longitudinal axis L1, L2 extending in parallel to the rotation axis (see FIG. 1).

The second portion 40 has a bridge portion 44 extending along the rear face of the respectively adjacent brake pad 26 and along a respectively adjacent (or opposite) side face of the brake disc 16. This bridge portion 44 is marked by longitudinal axis L3. At each circumferential outer end of said bridge portion 44, the second portion 40 has radial portions 46 connecting the bridge portion 44 with a respectively adjacent connecting portion 42. The radial portions 46 are marked by longitudinal axes L4, L5 extending in parallel to one another.

The only partially visible first portion 38 has a similar arrangement of longitudinal axes L3-L5 and associated bridge portion 44 and a radial portions 46 as the second portion 40. In FIG. 2, only one radial portion 46 and associated longitudinal axis L6 of the first portion 38 is visible.

FIG. 1 includes sectional axes A to C indicated by dashed lines and extending through the brake pad carrier 14. Even though not illustrated in full, a brake pad carrier 14 according to an embodiment the present invention may have a similar shape and extension as the brake pad carrier 14 of FIGS. 1 and 2. For example, it comprises a similar arrangement and sequence of longitudinal axis L1-L6 and first, second and connecting portion 38, 40, 42.

Accordingly, each segment of the brake pad carrier 14 of FIG. 1 intersected by the sectional axes A-C may comprise a part 48 configured according to an example of this invention and as discussed below with respect to 3A-C, 4A-C and 5A-C. This part 48 is non-casted and hollow.

Specifically, the brake pad carrier 14 according to an example of this invention may be configured from parts 48 forming a chain or sequence of parts 48 arranged along the sequence of longitudinal axes L1-L5 shown in FIG. 2. Each part 48 may cover or comprise a segment of at least one respective longitudinal axes L1-L5. The parts 48 may extend within only one of the first portion 38, the second portion 40 or the connecting portion 42 or in a plurality of said portions, thus e.g. having an angled, curved or bent shape.

In one example, a part 48 in a brake pad carrier 14 according to an embodiment of this invention may e.g. comprise at least a segment of each of the longitudinal axes L2 and L4 or of each of the longitudinal axes L1 and L5 of FIG. 2.

Additionally or alternatively, a part 48 in this brake pad carrier 14 (or in another brake pad carrier 14 according to an embodiment of this invention) may comprise at least a segment of each of the longitudinal axes L3 and L4 of FIG. 2 or of each of the longitudinal axes L3 and L5 of FIG. 2.

Additionally or alternatively, a part 48 in this brake pad carrier 14 (or in another brake pad carrier 14 according to an embodiment of this invention) may comprise at least a segment of both of the connecting portion 42 and the first portion 38 (or optionally also of the second portion 40) as indicated in FIG. 2. Still further, the first portion 38 may comprise a plurality of parts, at least one of which e.g. comprising a segment of a radial portion 46.

A respective succession of parts 48 is joined e.g. by welding to form a rigid brake caliper 14.

FIGS. 3A-C, 4A-C and 5A-C illustrate exemplary cross-sections of a part 48 located at the positions of the sectional axes A-C in FIG. 1.

Figure 3A:
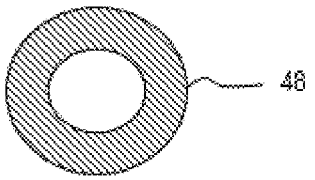
FIG. 3A to 3C are cross-sectional views through portions of a brake pad carrier according to embodiments of the present invention.
Figure 3B:
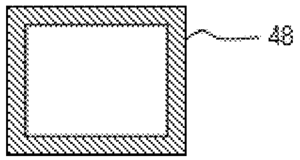
Figure 3C:
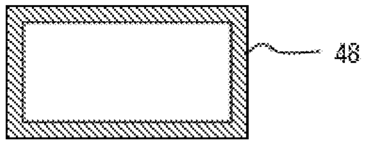

FIGS. 3A-C show examples of hollow cross-sections of parts 48. The non-illustrated longitudinal axes L1, 12 and L3 of FIG. 2 extend orthogonally to the image plane. The parts 48 are each metallic extrusion profiles. It is noted that each position of the sectional axes A-C in FIG. 1, a part 48 with the cross-section according to FIG. 3A or alternatively a part 48 with the cross-section according to FIG. 3B or 3C may be provided. The dimensions of said cross sections may vary at each position of the sectional axes A-C or may be identical. Providing respective uniform cross sections (preferably in the entire brake pad caliper 14, in particular when the entire brake pad caliper 14 is formed by (e.g. a succession of) parts 48) defines more uniform mechanical characteristics and in particular vibration characteristics.

Alternatively and e.g. depending on a required stiffness, parts 48 with the cross sections of FIGS. 3A-C may be mixed. Accordingly, at least two positions of the sectional axes A-C in FIG. 1, cross sections that are different from one another may be provided.

In FIG. 3A, the part 48 has a round and preferably circular cross-section. In FIG. 3B, the pad 48 has an almost quadratic rectangular cross-section (or alternatively a quadratic cross-section). In FIG. 3C, the part 48 has a flat rectangular cross-section.

In each of FIGS. 3A-C, the walls of the depicted cross-sections are massive, whereas the interior of the cross sections is empty. The massive walls improve stiffness. The empty interior provides a vibration dampening effect.

Figure 4A:
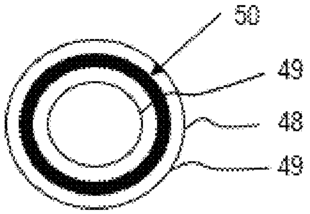
FIG. 4A to 4C are cross-sectional views through portions of a brake pad carrier according to embodiments of the present invention, the cross-section having a hollow double-walled portion that is filled with vibration dampening material.
Figure 4B:
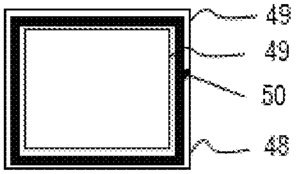
Figure 4C:
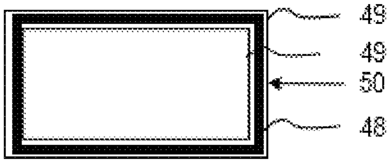

FIGS. 4A-C show alternative configurations of cross sections of parts 48 arranged at the positions of the sectional axes A-C in FIG. 1. Similar considerations apply as discussed above with respect to FIGS. 3A-C in terms of the parts 48 provided at said positions having a uniform cross-section or have cross-sections that are mixed from the examples of FIGS. 4A-C.

In FIGS. 4A-C, again a circular, an almost quadratic (or alternatively quadratic) and a flat rectangular cross-section are shown, similar to FIGS. 3A-C. In this case, however, the cross-sections are double-walled by inserting two sub-parts 49 into one another, so as to overlap. An axis of insertion (or overlap) extends orthogonally to the image plane and may correspond to one of the longitudinal axis L1-L6 of FIG. 2.

Each sub-part 49 is made from a sheet material that is bent into the depicted cross-sectional shape. The cross-section is closed by joining opposite edge regions of said sheet material. Each sub-part 49 is held in place e.g. by being joined to a non-displaced adjacent part 48 (e.g. adjacent along one of the longitudinal axis L1-L6 of FIG. 2). A space in between the sub-parts 49 is hollow and filled with a noise dampening material 50 that is e.g. formed into a material layer.

Figure 5A:
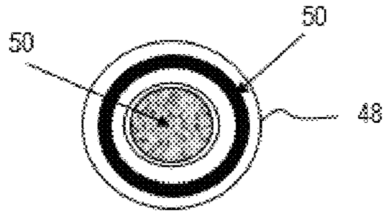
FIG. 5A to 5C are cross-sectional views through portions of a brake pad carrier according to embodiments of the present invention, the cross-section having a hollow centre that is filled with vibration dampening material.
Figure 5B:
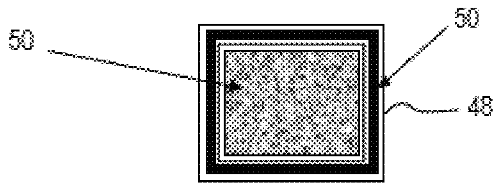
Figure 5C:
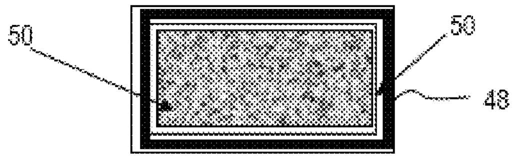

FIGS. 5A-C are identical to the examples of FIGS. 4 A-C but additionally add a noise dampening material 50 in the centre (or in the core) of the respective cross sections. This central noise dampening material 50 may be identical to or may be different from the noise dampening material 50 in between the walls of the double walled structure formed by the sub-parts 49. It further enhances the vibration dampening effect. A non-illustrated embodiment includes providing a noise dampening material 50 only in the core or centre of the cross-section, but not in between the walls of the double-walled structure.

Figure 6:
FIGS. 6 & 7 show an alternative cross-sectional shapes according to embodiments of the invention.

Note that apart from the parts 48 having hollow cross-sections according to the depicted examples in FIGS. 3A-C, 4A-C and 5A-C, the parts 48 may likewise be provided by at least one e.g. bent sheet material 52 and without defining a respective hollow cross-section. As indicated in FIG. 6, the sheet material 52 may e.g. be bent or kinked to assume an open cross-sectional shape (e.g. the depicted open triangular shape or alternatively a C- or U-shape).

Figure 7:
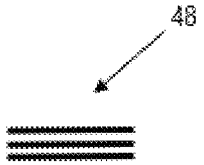

Alternatively, a layered configuration of multiple sheet materials 52 may be provided to form a part 48, see FIG. 7 in which three sheet materials 52 are shown. The sheets may e.g. be connected to one another by non-illustrated spot welds or non-illustrated mechanical fixing elements. Note that the example of FIG. 6 could also include a number of correspondingly bent sheet materials forming a layered structure similar to FIG. 7.

What is claimed is:

1. A brake pad carrier (14) for a vehicle disc brake (11), the vehicle disc brake (11) comprises a brake disc (16) that is configured to rotate about a rotation axis (R) and a pair of brake pads (26) to be carried by the brake pad carrier (14), a first brake pad (26) being configured to contact a first side face of the brake disc (16) and a second brake pad (26) being configured to contact an opposite second side face of the brake disc (16), wherein the brake pad carrier (14) comprises:

a first portion (38) that is configured to be arranged on the first side face of the brake disc (16) and configured to support the first brake pad (26);

a second portion (40) that is configured to be arranged on the second side face of the brake disc (16) and configured to support the second brake pad (26);

at least one connecting portion (42) connecting the first portion (38) and the second portion (40) and configured to extend from the first side face to the second side face of the brake disc (16), wherein at least one of the first portion (38), the second portion (40) and the connecting portion (42) comprises a part (48) that is at least one of:

a) a part (48) having a hollow cross-sectional shape, wherein the hollow cross-section is at least partially filled with a vibration dampening material (50);

b) a part (48) comprising sheet metal or sheet plastic, wherein the sheet metal or sheet plastic is arranged and formed to comprise at least one section in which a vibration dampening material is received, wherein the sheet metal or sheet plastic is arranged and formed to define at least one double-walled section of the part (48).

2. The brake pad carrier (14) according to claim 1, wherein the vibration dampening material (50) comprises one of: a porous material, a foamed material, a particulate material, a material that is more elastic than a material of the part (48).

3. The brake pad carrier (14) according to claim 1, wherein the second portion (40) comprises a bridge portion (44) extending along a rear face of the second brake pad (26), the part (48) being comprised by this bridge portion (44).

4. The brake pad carrier (14) according to claim 1, wherein there are two connecting portions (42) that are spaced apart along a circumference of the brake disc (16), wherein both connecting portions (42) comprise a respective part (48), the parts (48) being configured identically to one another.

5. The brake pad carrier (14) according to claim 1, wherein a respective part (48) is provided in each of at least two of the first portion (38), the second portion (40) and the connecting portion (42), these parts (48) being shaped and dimensioned identically to one another.

6. The brake pad carrier (14) according to claim 1, wherein a plurality of respective parts (48) is provided, wherein at least two adjacent parts (48) are joined to one another.

7. The brake pad carrier (14) according to claim 1, wherein the part (48) is produced by other methods than metal casting, wherein the brake pad carrier (14) is free of any metal casted parts (48).

8. A method for manufacturing a brake pad carrier (14) for a vehicle disc brake (11), the vehicle disc brake (11) comprises a brake disc (16) that is configured to rotate about a rotation axis (R) and a pair of brake pads (26) that are carried by the brake pad carrier (14), a first brake pad (26) being configured to contact a first side face of the brake disc (16) and a second brake pad (26) being configured to contact an opposite second side face of the brake disc (16); wherein the brake pad carrier (14) comprises:

a first portion (38) that is configured to be arranged on the first side face of the brake disc (16) and configured to support the first brake pad (26);

a second portion (40) that is configured to be arranged on the second side face of the brake disc (16) and configured to support the second brake pad (26);

at least one connecting portion (42) connecting the first portion (38) and the second portion (40) and configured to extend from the first side face to the second side face of the brake disc (16), the method comprising: manufacturing at least one of the first portion (38), the second portion (40) and the connecting portion (42) from a part (48) that is at least one of:

a) a part (48) having a hollow cross-sectional shape, wherein the hollow cross-section is at least partially filled with a vibration dampening material (50);

b) a part (48) comprising sheet metal or sheet plastic, wherein the sheet metal or sheet plastic is arranged and formed to comprise at least one section in which a vibration dampening material is received, wherein the sheet metal or sheet plastic is arranged and formed to define at least one double-walled section of the part (48).

9. The method according to claim 8, further comprising manufacturing the part (48) according to option a) by extrusion; or manufacturing the part according to option b) by bending.

* * * * *